United States Patent
Cerny et al.

(10) Patent No.: US 10,235,219 B2
(45) Date of Patent: Mar. 19, 2019

(54) BACKWARD COMPATIBILITY BY ALGORITHM MATCHING, DISABLING FEATURES, OR THROTTLING PERFORMANCE

(71) Applicant: Sony Interactive Entertainment LLC, San Mateo, CA (US)

(72) Inventors: Mark Evan Cerny, Los Angeles, CA (US); David Simpson, Los Angeles, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 14/810,334

(22) Filed: Jul. 27, 2015

(65) Prior Publication Data
US 2017/0031732 A1    Feb. 2, 2017

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 9/445 | (2018.01) |

(52) U.S. Cl.
CPC .......... *G06F 9/541* (2013.01); *G06F 9/44505* (2013.01); *G06F 9/46* (2013.01)

(58) Field of Classification Search
CPC ....................................................... G06F 9/541
USPC ........................................................ 719/320
See application file for complete search history.

(56) References Cited

U.S. PATENT DOCUMENTS

| 6,772,315 B1 | 8/2004 | Perego |
| 7,046,245 B2 | 5/2006 | Cerny et al. |
| 7,081,893 B2 | 7/2006 | Cerny |
| 7,786,993 B2 | 8/2010 | Cerny et al. |
| 8,031,192 B2 | 10/2011 | Cerny |
| 8,149,242 B2 | 4/2012 | Langyel et al. |
| 8,174,527 B2 | 5/2012 | Cerny et al. |
| 2003/0112238 A1 | 6/2003 | Cerny et al. |
| 2003/0112240 A1 | 6/2003 | Cerny |
| 2005/0033831 A1* | 2/2005 | Rashid ................... H04L 49/00 709/220 |
| 2005/0154915 A1 | 7/2005 | Peterson et al. |
| 2006/0001674 A1 | 1/2006 | Cerny et al. |

(Continued)

OTHER PUBLICATIONS

U.S. Appl. No. 14/627,988, to Mark Evan Cerny, filed Feb. 20, 2015.

(Continued)

*Primary Examiner* — Timothy A Mudrick
(74) *Attorney, Agent, or Firm* — JDI Patent; Joshua D. Isenberg; Robert A. Pullman

(57) ABSTRACT

A new device executing an application on a new CPU determines whether the application is for a legacy device having a legacy CPU. When the application is for the legacy device, the new CPU executes the application with selected features of the new CPU that are not present on the legacy CPU disabled, or with a latency of instruction execution of the new CPUs altered to match or approximate a latency of the legacy CPU, or with algorithmic details of operation of one or more units of the new CPU altered to match or approximate algorithmic details of operation of corresponding units of the legacy CPU.

22 Claims, 3 Drawing Sheets

(56) References Cited

U.S. PATENT DOCUMENTS

| | | |
|---|---|---|
| 2006/0005200 A1 | 1/2006 | Vega et al. |
| 2006/0010450 A1 | 1/2006 | Culler |
| 2006/0046819 A1* | 3/2006 | Nguyen .................. G07F 17/32 463/16 |
| 2006/0146057 A1 | 7/2006 | Blythe |
| 2007/0002049 A1 | 1/2007 | Cerny |
| 2007/0061634 A1 | 3/2007 | Marisetty et al. |
| 2008/0010408 A1 | 1/2008 | Shen et al. |
| 2009/0002380 A1 | 1/2009 | Langyel et al. |
| 2009/0063772 A1 | 3/2009 | Magoshi |
| 2009/0119477 A1 | 5/2009 | Plondke et al. |
| 2009/0164766 A1 | 6/2009 | Suggs et al. |
| 2010/0283783 A1 | 11/2010 | Cerny et al. |
| 2011/0103494 A1 | 5/2011 | Ahmadi |
| 2013/0339649 A1 | 12/2013 | Hsu et al. |
| 2014/0082625 A1 | 3/2014 | Busaba et al. |
| 2014/0282425 A1* | 9/2014 | Zhao .................. G06F 11/3688 717/127 |
| 2014/0304771 A1 | 10/2014 | Reierson et al. |
| 2014/0362081 A1 | 12/2014 | Cerny et al. |
| 2014/0362100 A1 | 12/2014 | Cerny et al. |
| 2014/0362101 A1 | 12/2014 | Cerny et al. |
| 2014/0362102 A1 | 12/2014 | Cerny et al. |
| 2015/0287158 A1 | 10/2015 | Cerny et al. |
| 2015/0287166 A1 | 10/2015 | Cerny |
| 2015/0287167 A1 | 10/2015 | Cerny |
| 2015/0287230 A1 | 10/2015 | Cerny |
| 2015/0287232 A1 | 10/2015 | Cerny |
| 2016/0092677 A1 | 3/2016 | Patel et al. |
| 2017/0001732 A1 | 1/2017 | Lim |
| 2017/0123961 A1 | 5/2017 | Cerny et al. |
| 2017/0192796 A1 | 7/2017 | Kunjuraman et al. |

OTHER PUBLICATIONS

U.S. Appl. No. 14/810,361, to Mark Evan Cerny, filed Jul. 27, 2015.
U.S. Appl. No. 14/930,408, to Mark Evan Cerny, filed Nov. 2, 2015.
International Search Report and Written Opinion for International Application No. PCT/US2016/041762, dated Oct. 5, 2016.
International Search Report and Written Opinion for International Application No. PCT/US2016/041767, dated Oct. 11, 2016.
Final Office Action for U.S. Appl. No. 14/810,361, dated Oct. 20, 2017.
Non-Final Office Action for U.S. Appl. No. 14/810,361, dated Jun. 2, 2017.
Non-Final Office Action for U.S. Appl. No. 14/810,361, dated Mar. 28, 2018.
International Search Report dated Jun. 1, 2017 for International Patent Application No. PCT/US2017/023771.
Non-Final Office Action for U.S. Appl. No. 15/466,759, dated Aug. 9, 2018.
Non-Final/Final Office Action for U.S. Appl. No. 14/810,334, dated Sep. 12, 2017.
Office Action dated Jun. 6, 2018 for Taiwan Patent Application No. 105120792.

* cited by examiner

BACKWARD COMPATIBILITY BY ALGORITHM MATCHING, DISABLING FEATURES, OR THROTTLING PERFORMANCE

FIELD OF THE DISCLOSURE

Aspects of the present disclosure are related to execution of a computer application on a computer system. In particular, aspects of the present disclosure are related to a system or a method that provides backward compatibility for applications/titles designed for older versions of a computer system.

BACKGROUND

Modern computer systems often use a number of different processors for different computing tasks. For example, in addition to a number of central processing units (CPUs), a modern computer may have a graphics processing unit (GPU) dedicated to certain computational tasks in a graphics pipeline, or a unit dedicated to digital signal processing for audio, all of which are potentially part of an accelerated processing unit (APU) that may contain other units as well. These processors are connected to memory of various types, using buses that may be internal to an APU or externally located on the computer's motherboard.

It is common that a set of applications are created for a computer system such as a video game console or smartphone (the "legacy device"), and when a variant or a more advanced version of the computer system is released (the "new device") it is desirable for the applications of the legacy device to run flawlessly on the new device without recompilation or any modification that takes into account the properties of the new device. This aspect of the new device, as contained in its hardware architecture, firmware and operating system, is often referred to as "backwards compatibility."

Backwards compatibility is often achieved through binary compatibility, where the new device is capable of executing programs created for the legacy device. However, when the real time behavior of the category of devices is important to their operation, as is in the case of video game consoles or smartphones, significant differences in the speed of operation of a new device may cause it to fail to be backwards compatible with respect to a legacy device. If the new device is of lower performance than the legacy device, issues that prevent backwards compatibility may arise; this is also true if the new device is of higher performance, or has different performance characteristics when compared to the legacy device.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Figure 1:
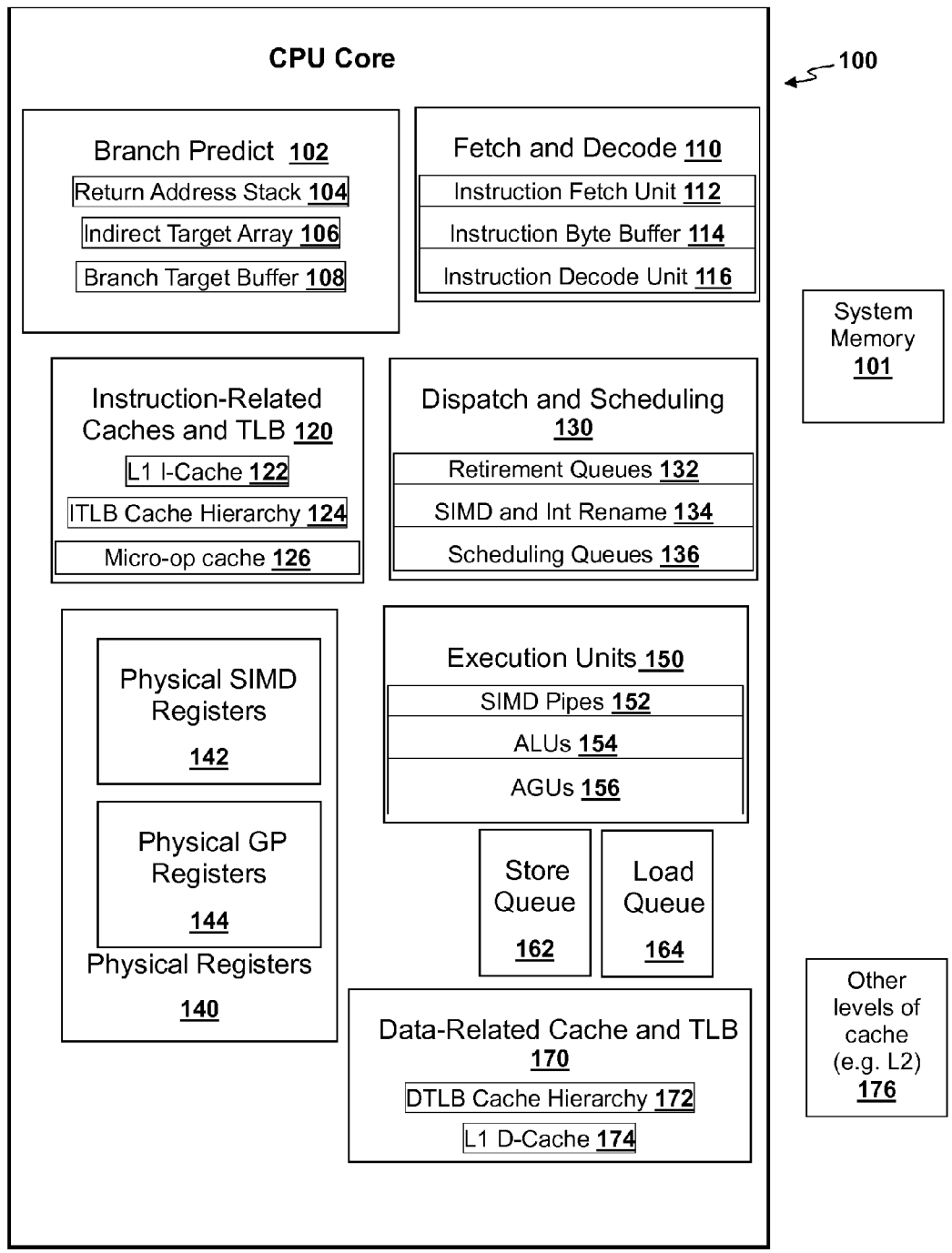
FIG. 1 is a block diagram illustrating an example of a central processing unit (CPU) core that may be configured to operate in a backwards compatibility mode in accordance with aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Even if the CPUs of the new device are binary compatible with the legacy device (i.e. capable of executing programs created for the legacy device), differences in performance characteristics between the CPUs of the new device and the CPUs of the legacy device may cause errors in legacy applications, and as a result the new device will not be backwards compatible.

If the CPUs of the new device have lower performance than the CPUs of the legacy device, many errors in a legacy application may arise due to the inability to meet real time deadlines imposed by display timing, audio streamout or the like. If the CPUs of the new device have substantially higher performance than the CPUs of the legacy device, many errors in a legacy application may arise due to the untested consequences of such high speed operation. For example, in a producer-consumer model, if a consumer of data (e.g. the CPU) operates at higher speed than originally anticipated, it may attempt to access data before the data producer (e.g. some other component of the computer) makes it available. Alternatively if the producer of the data (e.g. the CPU) operates at higher speed than originally anticipated, it may overwrite data still being used by the data consumer (e.g. some other component of the computer).

Additionally, as speed of execution of code by a CPU depends on the characteristics of the specific code being executed, it is possible that the degree of increase of performance of the CPUs of the new device relative to the legacy device will depend on the specific code being executed. This may lead to problems in the producer-consumer model described above, where producer and consumer are both CPUs but are executing the code of the legacy application at relative speeds not encountered on the legacy hardware.

Embodiments

Aspects of the present disclosure describe computer systems and methods which may allow for a higher degree of backwards compatibility with regards to legacy computer systems.

In implementations of the present disclosure, certain resources relating to the CPUs are restricted and various aspects of the operation of the CPUs are altered when executing in a backwards compatibility mode ("BC mode").

Due to the restriction of various resources, the performance of the CPUs in BC mode may become much closer to that of the legacy CPUs, resulting in fewer errors in legacy applications due to the unanticipated performance characteristics of the CPUs.

Additionally, certain features of the CPUs that are not present on legacy CPUs may be disabled in BC mode; the latency of instruction execution of the CPUs may be altered in BC mode to equal or become closer to the latency of legacy CPUs; and the algorithmic details of the operation of various units of the CPUs may be altered in BC mode to match or approximate the algorithmic details of the operation of those units of the legacy CPUs. As a result, when in BC mode, the performance of the new CPUs may become much closer to that of the legacy CPUs, resulting in fewer errors in legacy applications due to the unanticipated performance characteristics of the new CPUs.

The following describes the general architecture of a CPU, and various aspects of the present disclosure relating to the restriction of specific resources, disabling of features, alteration of latency, and alteration of algorithmic details of operation when in BC mode.

FIG. 1 depicts a generalized architecture of a CPU core 100. The CPU core 100 typically includes a branch prediction unit 102, that attempts to predict whether a branch will be taken or not, and also attempts (in the event that the branch is taken) to predict the destination address of the branch. To the extent that these predictions are correct the efficiency of speculatively executed code will be increased; highly accurate branch prediction is therefore extremely desirable. The branch prediction unit 102 may include highly specialized sub-units such as a return address stack 104 that tracks return addresses from subroutines, an indirect target array 106 that tracks the destinations of indirect branches, and a branch target buffer 108 and its associated prediction logic that track past history of branches in order to more accurately predict their resulting addresses.

According to certain aspects of the present disclosure, in BC mode the size of the indirect target array 106, the size of the return address stack 104, or the size of the branch target buffer 108 of the new CPU may be reduced to match, or to more closely approximate, their respective size for the legacy CPU. To be clear, this reduction takes the form of reducing the usable portion of the resource, e.g. not allowing usage of a portion of the return address stack, and thereby reducing the number of calls and associated returns that can be tracked; the full resource is available when not in BC mode.

According to certain aspects of the present disclosure, in BC mode the algorithmic details of the operation of the branch target buffer 108 of the new CPU and its associated prediction logic may be altered to match those of the legacy CPU. By way of example and not by way of limitation, if the legacy CPU is limited in its ability to track the behavior of branch instructions that are close to each other, then in BC mode the new CPU may match this legacy CPU behavior; or if the legacy CPU used a substantially different style of branch prediction logic (e.g. a saturating counter rather than an adaptive predictor) then the new CPU may include the logic of the legacy CPU and enable it in BC mode.

According to certain aspects of the present disclosure, should the branch target buffer 108 of the new CPU and its associated prediction logic include a dedicated loop predictor, but no dedicated loop predictor is present on the legacy CPU, then in BC mode the dedicated loop predictor of the new CPU may be disabled.

The CPU core 100 typically includes an instruction fetch and decode unit 110, which includes an instruction fetch unit 112, an instruction byte buffer 114, and an instruction decode unit 116. The CPU core 100 also typically includes a number of instruction related caches and instruction translation lookaside buffers (ITLBs) 120. These may include an ITLB cache hierarchy 124 that caches virtual address to physical address translation information such as page table entries, page directory entries, and the like. This information is used to transform the virtual address of the instruction into a physical address so that the instruction fetch unit 112 can load the instructions from the cache hierarchy. By way of example, and not by way of limitation, the program instructions may be cached according to a cache hierarchy that includes a level 1 instruction cache (L1 I-Cache) 122 residing in the core, as well as other cache levels 176 external to the CPU core 100; using the physical address of the instruction, these caches are first searched for the program instructions. If the instructions are not found, then they are loaded from a system memory 101. Depending on the architecture, there may also be a micro-op cache 126 that contains the decoded instructions, as described below.

In certain aspects of the present disclosure, in BC mode the size or associativity of the L1 I-cache 124, the micro-op cache 126 or the various levels of the ITLB cache hierarchy 122 may be changed to match, or to more closely approximate, their respective size and associativity for the legacy CPU. By way of example, and not by way of limitation, changing, e.g., reducing, the size of the ITLB cache hierarchy 124 could involve (1) reducing the number of levels; or (2) changing the size of one or more levels (e.g., cache size, block size, number of blocks in a set). Altering the associativity of a cache may involve, e.g., operating a fully associative cache as a four-way or two-way cache. Although aspects of the present disclosure include implementations where a size or associativity of an instruction-related cache or ITLB is reduced, the present disclosure is not limited to such implementations. For example, it is possible for a legacy CPU has to have a larger cache that is less associative (e.g., 2-way instead of 4-way) in the legacy CPU. In such a case, the new CPU may run in BC mode with the corresponding cache size increased and associativity reduced to match or approximate the behavior of the cache on the legacy CPU.

Once the program instructions have been fetched, they are typically placed in the instruction byte buffer 114 awaiting processing by the instruction fetch and decode unit 110. Decoding can be a very complex process; it is difficult to decode multiple instructions each cycle, and there may be restrictions on instruction alignment or type of instruction that limit how many instructions may be decoded in a cycle. Decoded instructions may, depending on architecture, be placed in the micro-op cache 126 (if one is present on the new CPU) so that the decode stage can be bypassed for subsequent use of the program instructions.

In certain aspects of the present disclosure, in BC mode the algorithmic details of the operation of the instruction fetch and decode unit 110 of the new CPU may be altered to match those of the legacy CPU. By way of example, and not by way of limitation, if the legacy CPU restricted the decode to instructions with opcodes within a specific area in the instruction byte buffer 114, then the new CPU may similarly restrict the decode.

In certain aspects of the present disclosure, should a micro-op cache 126 be present on the new CPU and absent on the legacy CPU, then in BC mode the micro-op cache 126 of the new CPU may be disabled.

Decoded instructions are typically passed to other units for dispatch and scheduling 130. These units may use retirement queues 132 to track the status of the instructions throughout the remainder of the CPU pipeline. Also, due to the limited number of general purpose and SIMD registers available on many CPU architectures, register renaming may be performed, in which as logical (also known as architectural) registers are encountered in stream of instructions being executed, physical registers 140 are assigned to represent them. The physical registers 140 may include Single Instruction Multiple Data (SIMD) register banks 142 and General Purpose (GP) register banks 144, which can be much larger in size than the number of logical registers available on the particular CPU architecture, and as a result the performance can be considerably increased. After register renaming 134 is performed, instructions are typically placed in scheduling queues 136, from which a number of instructions may be selected each cycle (based on dependencies) for execution by execution units 150.

In certain aspects of the present disclosure, in BC mode the size of the retirement queues 132, the size of the scheduling queues 136, or the size of the SIMD 142 or GP register banks 144 of the CPU may be reduced to match, or to more closely approximate, their respective size for the legacy CPU. To be clear, this reduction takes the form of reducing the usable portion of the resource, e.g. restricting the number of physical registers available to the application in BC mode; the full register bank would be available for use by applications when not in BC mode.

The execution units 150 typically include SIMD pipes 152 that perform a number of parallel operations on multiple data fields contained in 128-bit or wider SIMD registers contained in the SIMD register bank 142, arithmetic and logic units (ALUs) 154 that perform a number of logical, arithmetic, and miscellaneous operations on GPRs contained in the GP register bank 144, and address generation units (AGUs) 156 that calculate the address from which memory should be stored or loaded. There may be multiple instances of each type of execution unit, and the instances may have differing capabilities, for example a specific SIMD pipe 152 may be able to perform floating point multiply operations but not floating point add operations.

In certain aspects of the present disclosure, in BC mode the usable number of ALUs, AGUs or SIMD pipes may be reduced to match, or to more closely approximate, the respective number of such units that exist on the legacy CPU.

In certain aspects of the present disclosure, in BC mode the latency of instruction execution of the new CPU may be altered in such a way as to equal or become closer to the latency of the legacy CPU; for example, in BC mode the latency of a divide operation on the new CPU could be extended (e.g. by computing the result more slowly or by delaying the transfer of the result to the subsequent stage of the pipeline) to match, or to more closely approximate, the latency of a divide operation on the legacy CPU.

Stores and loads are typically buffered in a store queue 162 and a load queue 164 so that many memory operations can be performed in parallel. To assist in memory operations, the CPU core 100 usually includes a number of data related caches and data translation lookaside buffers (DTLBs) 170. A DTLB cache hierarchy 172 caches virtual address to physical address translation such as page table entries, page directory entries, and the like; this information is used to transform the virtual address of the memory operation into a physical address so that data can be stored or loaded from system memory. The data is typically cached in a level 1 data cache (L1 D-Cache) 174 residing in the core, as well as other cache levels 176 external to the core 100.

In certain aspects of the present disclosure, in BC mode the size and associativity of the L1 D-cache 174 or the various levels of the DTLB cache hierarchy 172 may be reduced to match, or to more closely approximate, their respective size and associativity for the legacy CPU. In certain aspects of the present disclosure, in BC mode the size of the store queue 162 or load queue 164 of the CPU (e.g. the number of allowable outstanding stores or loads) may be reduced to match, or to more closely approximate, their respective size for the legacy CPU.

Figure 2:
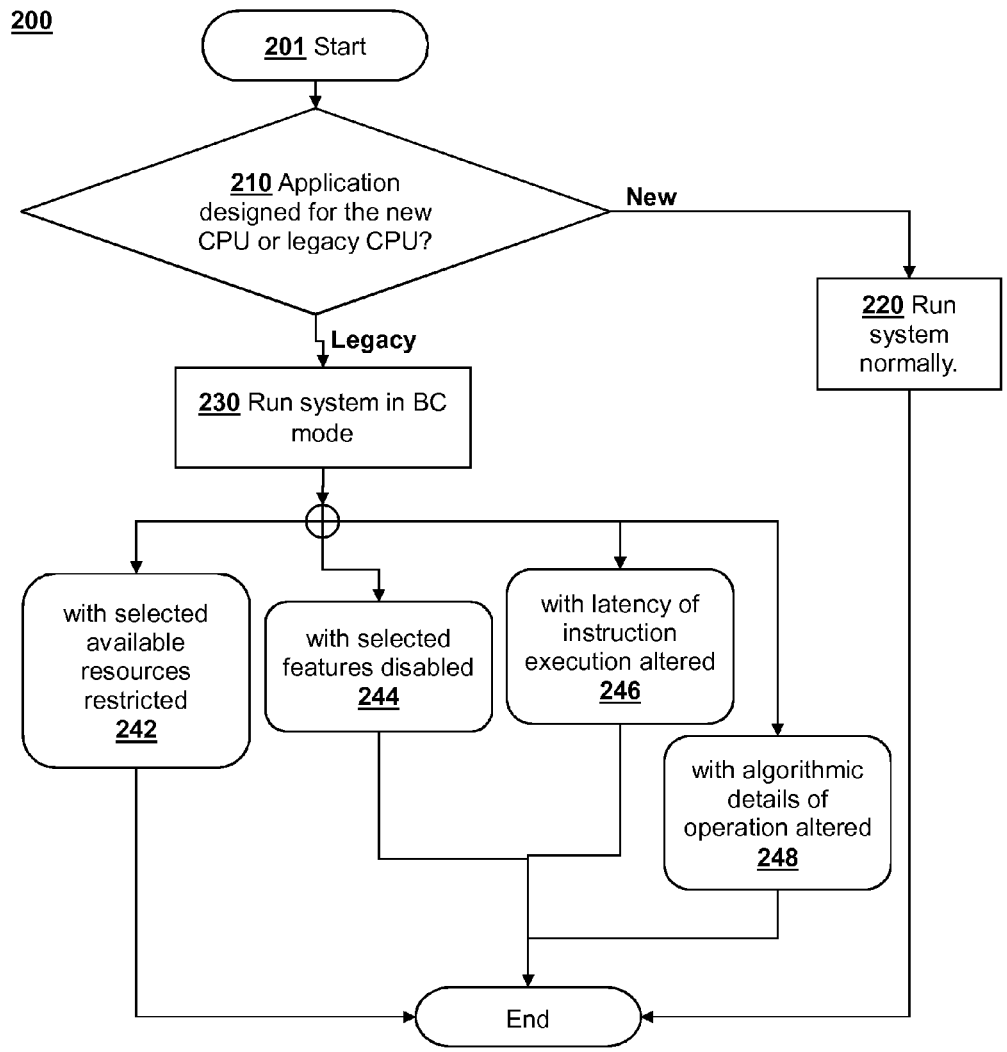
FIG. 2 is a flow diagram illustrating an example of a possible process flow for operating a CPU in a backwards compatibility mode in accordance with aspects of the present disclosure.

FIG. 2 is a flow diagram illustrating an example of a possible process flow of a method in accordance with aspects of the present disclosure. The method starts at 201, e.g., by loading an application onto a system having a new CPU. Via an examination of a software ID, software checksum, metadata associated with the software, media type, or other mechanism, a determination is made if an application is designed for a new CPU or for the prior versions of the system, as indicated at 210. Such a determination may be implemented in software running on the system or in hardware of the system. When it is determined that the loaded application is intended for the new CPU, the system may run normally, as indicated at 220. For example, the CPU may run normally without restriction on available resources, without disabling features, altering latency of execution of instructions, or altering algorithmic details to match or approximate behavior of a legacy CPU.

When it is determined that the loaded application is intended for a legacy CPU, the CPU runs in BC mode, with selected available resources restricted 242, with selected features not present on the legacy CPU disabled 244, with latency of execution of instructions altered 246, or with algorithmic details altered 248 or some combination of two or more of these to match or approximate behavior of the legacy CPU. Examples of these possibilities are discussed above.

By way of example, and not by way of limitation to operate the CPU with selected resources restricted 242, the BC mode may be implemented by suitable configuration of the hardware of the new CPU, by suitable configuration of an operating system that runs the CPU or some combination of both. For example, as discussed above, in BC mode the size of the indirect target array 106, the size of the return address stack 104, or the size of the branch target buffer 108 of the CPU may be reduced to match, or to more closely approximate, their respective size for the legacy CPU. By way of example and not by way of limitation, the relevant hardware may be configured so that in BC mode the operating system or CPU firmware could reduce the size of the indirect target array 106 to match, or to more closely approximate, their respective size for the legacy CPU. The following pseudocode illustrates an example of how this might be implemented:

```
void function BC_mode_indirect_target_array_size
    if BC_mode is true {
    set indirect_target_array_size to
    reduced_ indirect_target_array_size
    }
```

The size of the return address stack 104, or the size of the branch target buffer 108, or other available resources may be reduced in similar manner.

In a like manner, to operate the CPU with selected features disabled 244 certain hardware resources present on the new CPU that are not present on the legacy CPU (e.g., the micro-op cache 126) may be configured so that they can be disabled by the operating system or CPU firmware in BC mode. Alternatively, hardware resources present on the new CPU that are not present on the legacy CPU may be configured so that they are ignored by the application in BC mode.

By way of example, and not by way of limitation, to operate the CPU with a latency of instruction execution of the new CPUs altered 246 to match or approximate a latency of the legacy CPU the hardware of the execution units 150 may be configured to add the equivalent of "no-op" instructions in BC mode to obtain the desired latency in BC mode.

By way of example, and not by way of limitation, to operate the new CPU with algorithmic details of operation of one or more units of the new CPU altered 248. By way of example, and not by way of limitation, the algorithmic details of operation of the branch prediction unit 102 may be altered in BC mode. For example, as discussed above, if the legacy CPU is limited in its ability to track the behavior of branch instructions that are close to each other, then in BC mode the branch prediction unit 102 may be configured to match this legacy CPU behavior in BC mode. Alternatively, if the legacy CPU uses a substantially different style of branch prediction logic (e.g. a saturating counter rather than an adaptive predictor) then the branch prediction unit 102 of the new CPU may include the logic of the legacy CPU that can be enabled in BC mode. In other implementations, the algorithmic details of operation of the instruction fetch and decode unit 110, dispatch and scheduling unit 130, or execution units 150 of a new CPU may be similarly configured with legacy logic that could be enabled in BC mode.

Figure 3:
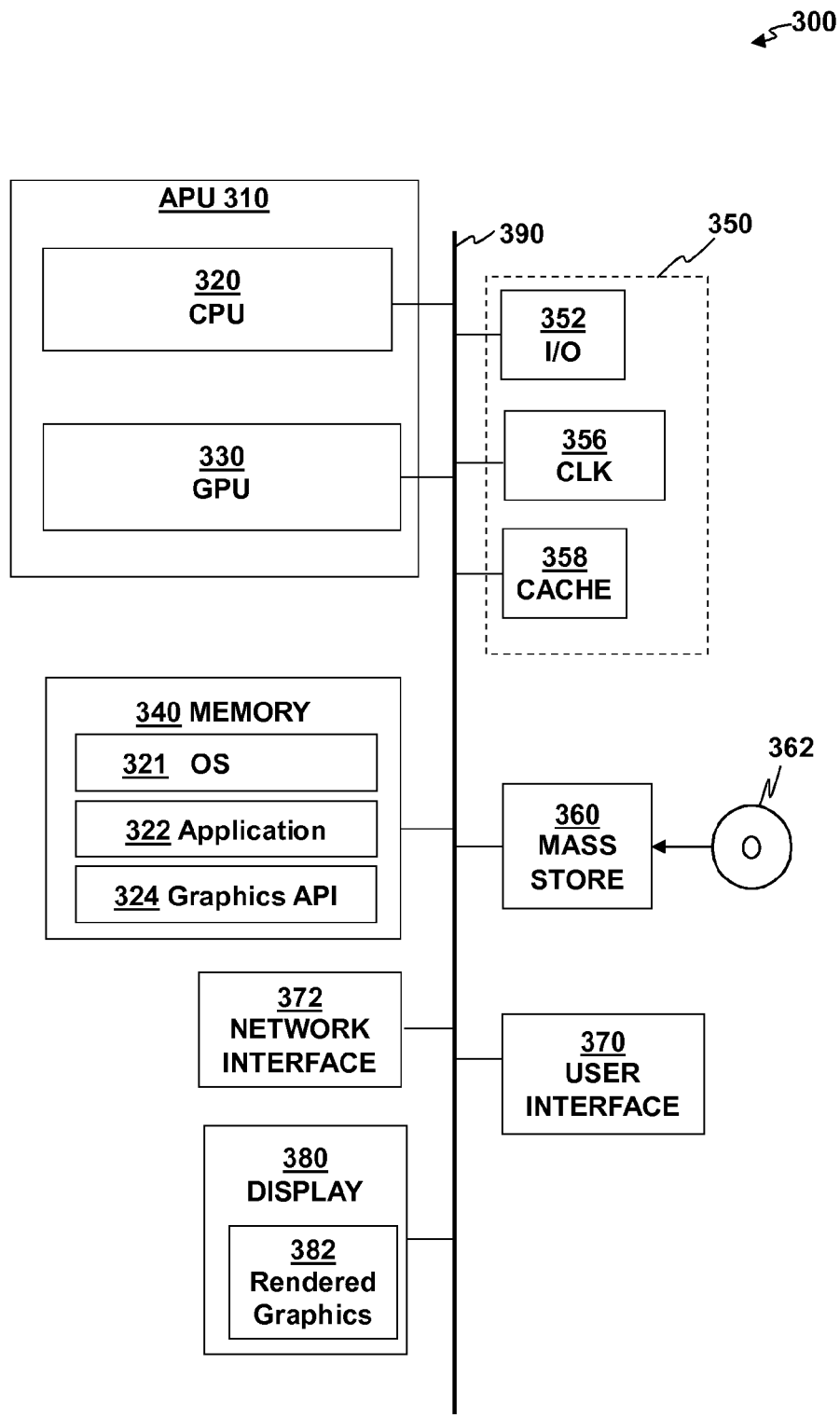
FIG. 3 is a block diagram of a device having a CPU configured to operate in a backwards compatibility mode in accordance with aspects of the present disclosure.

Turning now to FIG. 3, an illustrative example of a system 300 configured to operate in accordance with aspects of the present disclosure is depicted. According to aspects of the present disclosure, the system 300 may be an embedded system, mobile phone, personal computer, tablet computer, portable game device, workstation, game console, and the like.

The system 300 generally includes a central processor unit (CPU) 320 which may include a CPU core and other features of the type depicted in FIG. 1 and discussed above. By way of example and not by way of limitation, the CPU 320 may be part of an accelerated processing unit (APU) 310 that includes the CPU 320, and a graphics processing unit (GPU) 330 on a single chip. In alternative implementations, the CPU 320 and GPU 330 may be implemented as separate hardware components on separate chips.

The system 300 may also include memory 340. The memory 340 may optionally include a main memory unit that is accessible to the CPU 320 and GPU 330. The CPU 320 and GPU 330 may each include one or more processor cores, e.g., a single core, two cores, four cores, eight cores, or more. The CPU 320 and GPU 330 may be configured to access one or more memory units using a data bus 390, and, in some implementations, it may be useful for the system 300 to include two or more different buses.

The memory 340 may include one or more memory units in the form of integrated circuits that provides addressable memory, e.g., RAM, DRAM, and the like. The memory contains executable instructions configured to implement the method of FIG. 2 upon execution for determining operate the CPU 320 in a BC mode when running applications originally created for execution on a legacy CPU. In addition, the memory 340 may include a dedicated graphics memory for temporarily storing graphics resources, graphics buffers, and other graphics data for a graphics rendering pipeline.

The CPU 320 may be configured to execute CPU code, which may include operating system (OS) 321 or an application 322 (e.g., a video game). The OS 321 may be configured to implement certain features of operating the CPU 320 in the BC mode, as discussed above. The CPU code may include a graphics application programming interface (API) 324 for issuing draw commands or draw calls to programs implemented by the GPU 330 based on a state of the application 322. The CPU code may also implement physics simulations and other functions. Portions of the code for one or more of the OS 321, application 322, or API 324 may be stored in the memory 340, caches internal or external to the CPU or in a mass storage device accessible to the CPU 320.

The system 300 may also include well-known support functions 350, which may communicate with other components of the system, e.g., via the bus 390. Such support functions may include, but are not limited to, input/output (I/O) elements 352, one or more clocks 356, which may include separate clocks for the CPU and GPU, respectively, and one or more levels of cache 358, which may be external to the CPU 320. The system 300 may optionally include a mass storage device 360 such as a disk drive, CD-ROM drive, flash memory, tape drive, Blu-ray drive, or the like to store programs and/or data. In one example, the mass storage device 360 may receive a computer readable medium 362 containing a legacy application originally designed to run on a system having a legacy CPU. Alternatively, the legacy application 362 (or portions thereof) may be stored in memory 340 or partly in the cache 358.

The device 300 may also include a display unit 380 to present rendered graphics 382 prepared by the GPU 330 to a user. The device 300 may also include a user interface unit 370 to facilitate interaction between the system 100 and a user. The display unit 380 may be in the form of a flat panel display, cathode ray tube (CRT) screen, touch screen, head mounted display (HMD) or other device that can display text, numerals, graphical symbols, or images. The display 380 may display rendered graphics 382 processed in accordance with various techniques described herein. The user interface 370 may contain one or more peripherals, such as a keyboard, mouse, joystick, light pen, game controller, touch screen, and/or other device that may be used in conjunction with a graphical user interface (GUI). In certain implementations, the state of the application 322 and the underlying content of the graphics may be determined at least in part by user input through the user interface 370, e.g., where the application 322 includes a video game or other graphics intensive application.

The system 300 may also include a network interface 372 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

According to aspects of the present disclosure, the CPU 320 may include hardware components such as the components of the CPU core 100 of FIG. 1 that can operate in a BC mode with selected available resources restricted 242, with selected features not present on the legacy CPU disabled 244, with latency of execution of instructions altered 246, or with algorithmic details altered 248 or some combination of two or more of these to match or approximate behavior of the legacy CPU, as discussed above with respect to FIG. 2.

Aspects of the present disclosure overcome problems with backward compatibility that arise when programs written for a legacy system run on a more powerful new system. By running the new CPU in BC mode with selected available resources restricted, with selected features not present on the legacy CPU disabled, with latency of execution of instructions altered, or with algorithmic details altered or some combination of two or more of these the new CPU can match or approximate the behavior of the legacy CPU.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the term "or" is used as the inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. A method, comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with algorithmic details of operation of one or more units of the new CPU altered to match or approximate algorithmic details of operation of corresponding units of the legacy CPU, wherein executing the application on the new CPU with algorithmic details of operation of one or more units of the new CPU altered to match or approximate algorithmic details of operation of corresponding units of the legacy CPU includes operating the new CPU with algorithmic details of operation of a branch target buffer of the new CPU and associated prediction logic are altered to match or approximate algorithmic details of operation of a corresponding branch target buffer of the legacy CPU.

2. A method, comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with algorithmic details of operation of one or more units of the new CPU altered to match or approximate algorithmic details of operation of corresponding units of the legacy CPU, wherein executing the application on the new CPU with algorithmic details of operation of one or more units of the new CPU altered to match or approximate algorithmic details of operation of corresponding units of the legacy CPU includes operating the new CPU with algorithmic details of operation of an instruction decode unit of the CPU altered to match or approximate algorithmic details of operation of an instruction decode unit of the legacy CPU.

3. The method of claim 1, wherein executing the application on the new CPU includes executing the application on the new CPU with selected features of the new CPU that are not present on legacy CPU disabled.

4. A method, comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with selected features of the new CPU that are not present on the legacy CPU disabled, wherein executing the application on the new CPU with selected features of the new CPU that are not present on the legacy CPU disabled includes disabling a dedicated loop predictor of the new CPU when the new CPU and its associated prediction logic include the dedicated loop predictor, but the legacy CPU does not.

5. A method, comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with selected features of the new CPU that are not present on the legacy CPU disabled, wherein executing the application on the new CPU with selected features of the new CPU that are not present on legacy CPU disabled includes disabling a micro-op cache of the new CPU when the new CPU includes the micro-op cache, but the legacy CPU does not.

6. The method of claim 1, wherein executing the application on the new CPU includes executing the application on the new CPU with a latency of instruction execution of the new CPUs altered to match or approximate a latency of the legacy CPU.

7. The method of claim 6, wherein executing the application on the new CPU with a latency of instruction execution of the new CPUs altered to match or approximate a latency of the legacy CPU includes extending a latency of an operation on the new CPU to match or approximate a latency of the operation on the legacy CPU.

8. The method of claim 7, wherein extending the latency of the operation on the new CPU includes slowing down computation of a result on the new CPU.

9. The method of claim 7, wherein extending the latency of the operation on the new CPU includes delaying transfer of a result to a subsequent stage of a CPU pipeline.

10. A system, comprising,
a new central processing unit (CPU) configured to execute instructions of an application, the new CPU having logic units configured to determine whether the application is a legacy application designed to run on a legacy device having a legacy CPU, and execute the application with algorithmic details of operation of one or more units of the new CPU altered to match or approximate algorithmic details of operation of corresponding units of the legacy CPU, by altering algorithmic details of operation of a branch target buffer of the new CPU and associated prediction logic to match or approximate algorithmic details of operation of a corresponding branch target buffer of the legacy CPU when the application is a legacy application for the legacy device.

11. A system, comprising,
a new central processing unit (CPU) configured to execute instructions of an application, the new CPU having logic units configured to determine whether the application is a legacy application designed to run on a legacy device having a legacy CPU, and execute the application, wherein the new CPU is configured to execute the application with algorithmic details of operation of one or more units of the new CPU altered to match or approximate algorithmic details of operation of corresponding units of the legacy CPU by altering algorithmic details of operation of an instruction decode unit to match or approximate algorithmic details of operation of an instruction decode unit of the legacy CPU, when the application is a legacy application for the legacy device.

12. The system of claim 10, wherein the new CPU is configured to execute the application with selected features of the new CPU that are not present on legacy CPU disabled when the application is for the legacy device.

13. A system, comprising,
a new central processing unit (CPU) configured to execute instructions of an application, the new CPU having logic units configured to determine whether the application is a legacy application designed to run on a legacy device having a legacy CPU, and execute the application, wherein the new CPU is configured to execute the application with selected features of the new CPU that are not present on the legacy CPU disabled by disabling a dedicated loop predictor of the new CPU when the new CPU and its associated prediction logic include the dedicated loop predictor, but the legacy CPU does not, when the application is a legacy application for the legacy device.

14. A system, comprising,
a new central processing unit (CPU) configured to execute instructions of an application, the new CPU having logic units configured to determine whether the application is a legacy application designed to run on a legacy device having a legacy CPU, and execute the application, wherein the new CPU is configured to execute the application with selected features of the new CPU that are not present on legacy CPU disabled by disabling a micro-op cache of the new CPU when the new CPU includes the micro-op cache, but the legacy CPU does not.

15. The system of claim 10, wherein the new CPU is configured to execute the application with a latency of instruction execution of the new CPUs altered to match or approximate a latency of the legacy CPU.

16. The system of claim 15, wherein, wherein the new CPU is configured to execute the application with a latency of instruction execution of the new CPUs altered to match or approximate a latency of the legacy CPU by extending a latency of an operation on the new CPU to match or approximate a latency of the operation on the legacy CPU.

17. The system of claim 16, wherein extending the latency of the operation on the new CPU includes slowing down computation of a result on the new CPU.

18. The system of claim 16, wherein extending the latency of the operation on the new CPU includes delaying transfer of a result to a subsequent stage of a CPU pipeline.

19. A non-transitory computer readable medium having executable instructions embodied therein, the instructions being configured to implement a method upon execution of the instructions, the method comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with algorithmic details of operation of one or more units of the new CPU altered to match or approximate algorithmic details of operation of corresponding units of the legacy CPU, wherein executing the application on the new CPU with algorithmic details of operation of one or more units of the new CPU altered to match or approximate algorithmic details of operation of corresponding units of the legacy CPU includes operating the new CPU with algorithmic details of operation of a branch target buffer of the new CPU and associated prediction logic are altered to match or approximate algorithmic details of operation of a corresponding branch target buffer of the legacy CPU.

20. A non-transitory computer readable medium having executable instructions embodied therein, the instructions being configured to implement a method upon execution of the instructions, the method comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with algorithmic details of operation of one or more units of the new CPU altered to match or approximate algorithmic details of operation of corresponding units of the legacy CPU, wherein executing the application on the new CPU with algorithmic details of operation of one or more units of the new CPU altered to match or approximate algorithmic details of operation of corresponding units of the legacy CPU includes operating the new CPU with algorithmic details of operation of an instruction decode unit of the CPU altered to match or approximate algorithmic details of operation of an instruction decode unit of the legacy CPU.

21. A non-transitory computer readable medium having executable instructions embodied therein, the instructions being configured to implement a method upon execution of the instructions, the method comprising:
with a new device executing an application on a new CPU, determining whether the application is a legacy application designed to run on a legacy device having a legacy CPU; and
when the new device determines that the application is a legacy application designed to run on the legacy device, executing the application on the new CPU with selected features of the new CPU that are not present on the legacy CPU disabled, wherein executing the application on the new CPU with selected features of the new CPU that are not present on the legacy CPU disabled includes disabling a dedicated loop predictor of the new CPU when the new CPU and its associated prediction logic include the dedicated loop predictor, but the legacy CPU does not.

22. A non-transitory computer readable medium having executable instructions embodied therein, the instructions being configured to implement a method upon execution of the instructions, the method comprising:
with a new device executing an application on a new CPU, determining whether the application is a legacy application designed to run on a legacy device having a legacy CPU; and when the new device determines that the application is a legacy application designed to run on the legacy device, executing the application on the new CPU with selected features of the new CPU that are not present on the legacy CPU disabled, wherein executing the application on the new CPU with selected features of the new CPU that are not present on legacy CPU disabled includes disabling a micro-op cache of the new CPU when the new CPU includes the micro-op cache, but the legacy CPU does not.

* * * * *